United States Patent
Medina Acosta et al.

(10) Patent No.: US 12,301,510 B2
(45) Date of Patent: May 13, 2025

(54) RETRANSMISSION HANDLING FOR PRECONFIGURED UPLINK RESOURCES

(71) Applicant: TELEFONAKTIEBOLAGET LM ERICSSON (PUBL), Stockholm (SE)

(72) Inventors: Gerardo Agni Medina Acosta, Märsta (SE); Sandeep Narayanan Kadan Veedu, Täby (SE); Andreas Höglund, Solna (SE); Dung Pham Van, Upplands Väsby (SE); Johan Bergman, Stockholm (SE); Emre Yavuz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 385 days.

(21) Appl. No.: 17/431,161

(22) PCT Filed: Feb. 14, 2020

(86) PCT No.: PCT/IB2020/051271
§ 371 (c)(1),
(2) Date: Aug. 14, 2021

(87) PCT Pub. No.: WO2020/165862
PCT Pub. Date: Aug. 20, 2020

(65) Prior Publication Data
US 2022/0140983 A1     May 5, 2022

Related U.S. Application Data

(60) Provisional application No. 62/805,734, filed on Feb. 14, 2019.

(51) Int. Cl.
*H04L 5/00*     (2006.01)
*H04L 1/1867*   (2023.01)

(52) U.S. Cl.
CPC .......... *H04L 5/0082* (2013.01); *H04L 1/1887* (2013.01); *H04L 5/0044* (2013.01); *H04L 5/0055* (2013.01); *H04L 5/0091* (2013.01)

(58) Field of Classification Search
CPC ... H04L 5/0082; H04L 1/1887; H04L 5/0044; H04L 5/0055; H04L 5/0091; H04L 5/0007; H04L 5/0053
See application file for complete search history.

(56) References Cited

U.S. PATENT DOCUMENTS

2018/0324889 A1* 11/2018 Babaei .................. H04W 72/23
2019/0075563 A1*  3/2019 Babaei .................. H04L 5/0094
(Continued)

FOREIGN PATENT DOCUMENTS

WO     2018024946 A1    2/2018

OTHER PUBLICATIONS

Ericsson; "Revised WID: Additional MTC enhancements for LTE" 3GPP TSG RAN Meeting #81, RP-181878; Gold Coast, Australia Sep. 10-13, 2018.
(Continued)

*Primary Examiner* — Sudesh M Patidar
(74) *Attorney, Agent, or Firm* — Ericsson Inc.

(57) ABSTRACT

Systems and methods for handling transmissions and retransmissions on a periodic preconfigured uplink resource (PUR) are provided. Respective resources for transmission and retransmission can be determined and configured for a wireless device to prevent blocking of a new data transmission on a PUR opportunity by a retransmission attempt. Responsive to determining that a first transmission on the PUR was unsuccessful, a second resource can be configured for the retransmission.

16 Claims, 13 Drawing Sheets

(56) References Cited

U.S. PATENT DOCUMENTS

2020/0015199 A1*  1/2020  Singh ................... H04L 1/1848
2020/0178293 A1*  6/2020  Jeons .................. H04W 72/044
2020/0412492 A1* 12/2020  Oh ........................ H04L 1/189
2022/0070915 A1*  3/2022  Awoniyi-Oteri ...... H04W 72/04
2022/0116881 A1*  4/2022  Shin ...................... H04L 1/189

OTHER PUBLICATIONS

Huawei, "Wid revision: Additional enhancements for NB-IoT", 3GPP TSG RAN meeting #81 RP-181674 (revision on RP-181451, Gold Coast, Australia, Sep. 10-13, 2018, 1-4.
Intel Corporation, UL transmission in preconfigured resources for eMTC, 3GPP TSG RAN WG1 Meeting #95, R1-1812455, Spokane, USA, Nov. 12-16, 2018.
MCC Support, Draft Report of 3GPP TSG RAN WG1 #95 v0.3.0, 3GPP TSG RAN WG1 Meeting #96, R1-190xxxx, Athens, USA, Feb. 25-Mar. 1, 2019.
MCC Support, Final Report of 3GPP TSG RAN WG1 #94 v1.0.0, 3GPP TSG RAN WG1 Meeting #94bis, R1-1810051, Chengdu, China Oct. 8-12, 2018.
MCC Support; "Final Report of 3GPP TSG RAN WG1 #94bis V1.0.0" 3GPP TSG RAN WG1 Meeting #95 R1-1812101, Spokane, USA Nov. 12-16, 2018.
Mediatek Inc., "Early Transmission in Preconfigured UL Resources in NB-IoT", 3GPP TSG-RAN WG2 Meeting #104, R2-1816957, Spokane, WA, USA, Nov. 12-16, 2018.
IPRP, dated May 31, 2021, from corresponding application PCT/IB2020/051271.

* cited by examiner

RETRANSMISSION HANDLING FOR PRECONFIGURED UPLINK RESOURCES

CROSS REFERENCE TO RELATED APPLICATIONS

This application claims the benefit of U.S. Provisional Application No. 62/805,734 filed on Feb. 14, 2019, the entire contents of which are hereby incorporated by reference.

TECHNICAL FIELD

The present disclosure generally relates to wireless communications and wireless communication networks.

INTRODUCTION

The Internet of Things (IoT) is a vision for the future world where everything that can benefit from a connection will be connected. Cellular technologies are being developed or evolved to play a role in the IoT world, particularly the machine type communication (MTC). MTC is characterized by lower demands on data rates than, for example, mobile broadband, but with higher requirements on low cost device design, better coverage, and ability to operate for years on batteries without charging or replacing the batteries, etc. To meet the IoT design objectives, standardization bodies such as Third Generation Partnership Project (3GPP) have standardized Narrowband IoT (NB-IoT) in Release 13 to include a system bandwidth of 180 kHz and target improved coverage, long battery life, low complexity communication design, and network capacity that is sufficient for supporting a massive number of devices.

In Release 16, work items on "Additional MTC enhancements for LTE" and "Additional enhancements for NB-IoT" were approved, which have in common the objective to improve uplink (UL) transmission efficiency and/or UE power consumption. This can include specifying support for transmission in preconfigured resources in idle and/or connected mode based on SC-FDMA waveform for UEs with a valid timing advance [RAN1, RAN2, RAN4]. Both shared resources and dedicated resources can be considered. It is noted that this may be limited to orthogonal (multi) access schemes.

In RAN1 #94bis, RAN1 elaborated on three definitions that will apply for the transmissions on preconfigured uplink resources (PUR):

Dedicated preconfigured UL resource is defined as an PUSCH resource used by a single UE:
  PUSCH resource is a time-frequency resource
  Dedicated PUR is contention-free Contention-free shared preconfigured UL resource (CFS PUR) is defined as an PUSCH resource simultaneously used by more than one UE:
  PUSCH resource is at least one time-frequency resource
  CFS PUR is contention-free Contention-based shared preconfigured UL resource (CBS PUR) is defined as an PUSCH resource simultaneously used by more than one UE:
  PUSCH resource is at least one time-frequency resource
  CBS PUR is contention-based (CBS PUR may require contention resolution)

In relation with the definitions above, the following agreement was also made in RAN1 #94bis: In idle mode, dedicated PUR is supported. Support for CFS PUR and support for CBS PUR is for further study.

In addition, it was agreed that:
Pre-configured UL resources for transmission of data are indicated by RRC signaling. At least UE-specific RRC signaling is supported.
For transmission in preconfigured UL resources, an RRC idle UE may use the latest Timing Advance (TA) that passed the validation criteria.

FIG. 1 illustrates basis of the dedicated PUR framework in idle-mode 20 as per the above agreements. In the example of FIG. 1, the legacy connection establishment is followed until the UE is in RRC-connected state 40, in such a way that the UE can obtain the PUR configuration via UE-specific RRC signaling. Then, when the UE is back to RRC-idle state 20, the UE can transmit on preconfigured UL resources if the latest TA it acquired passed some validation criteria as to consider it valid. The validation criteria encompasses some TA validation mechanisms agreed in RAN1 #94bis and #95, which will not be discussed in the present disclosure.

For a Dedicated PUR scheme in idle mode, one typical use case corresponds to handling periodic data transmissions typically followed by inactivity (which may be seconds, minutes, hours, or even days). In some scenarios, periodic transmissions and retransmissions may block each other over the pre-configured uplink resources.

SUMMARY

It is an object of the present disclosure to obviate or mitigate at least one disadvantage of the prior art.

There are provided systems and methods for handling transmissions and retransmissions on preconfigured uplink resources.

In a first aspect of the present disclosure, there is provided a method performed by a wireless device. The wireless device can comprise a radio interface and processing circuitry. The wireless device is configured with a periodic preconfigured uplink resource (PUR) for data transmission. It is determined that a first transmission on the PUR was unsuccessful. The wireless device receives scheduling information indicating to retransmit the unsuccessful first transmission on a second resource; and retransmits the first transmission on the second resource.

In another aspect of the present disclosure, there is provided a method performed by a network node. The network node can comprise a radio interface and processing circuitry. The network node configures a wireless device with a periodic preconfigured uplink resource (PUR) for data transmission. Responsive to determining that a first transmission on the PUR was unsuccessful, the network node transmits scheduling information indicating to retransmit the unsuccessful first transmission on a second resource. The network node receives the first transmission on the second resource.

In some embodiments, the PUR configuration includes at least one of a PUR transmission length and a PUR period. The PUR period can define a duration between subsequent transmission opportunities for the wireless device.

In some embodiments, the periodic PUR can be configured by radio resource control (RRC) signaling.

In some embodiments, the second resource is a non-PUR resource.

In some embodiments, the second resource is a second PUR resource other than the periodic PUR configured for data transmission.

In some embodiments, the second resource can be dynamically scheduled by the network node.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
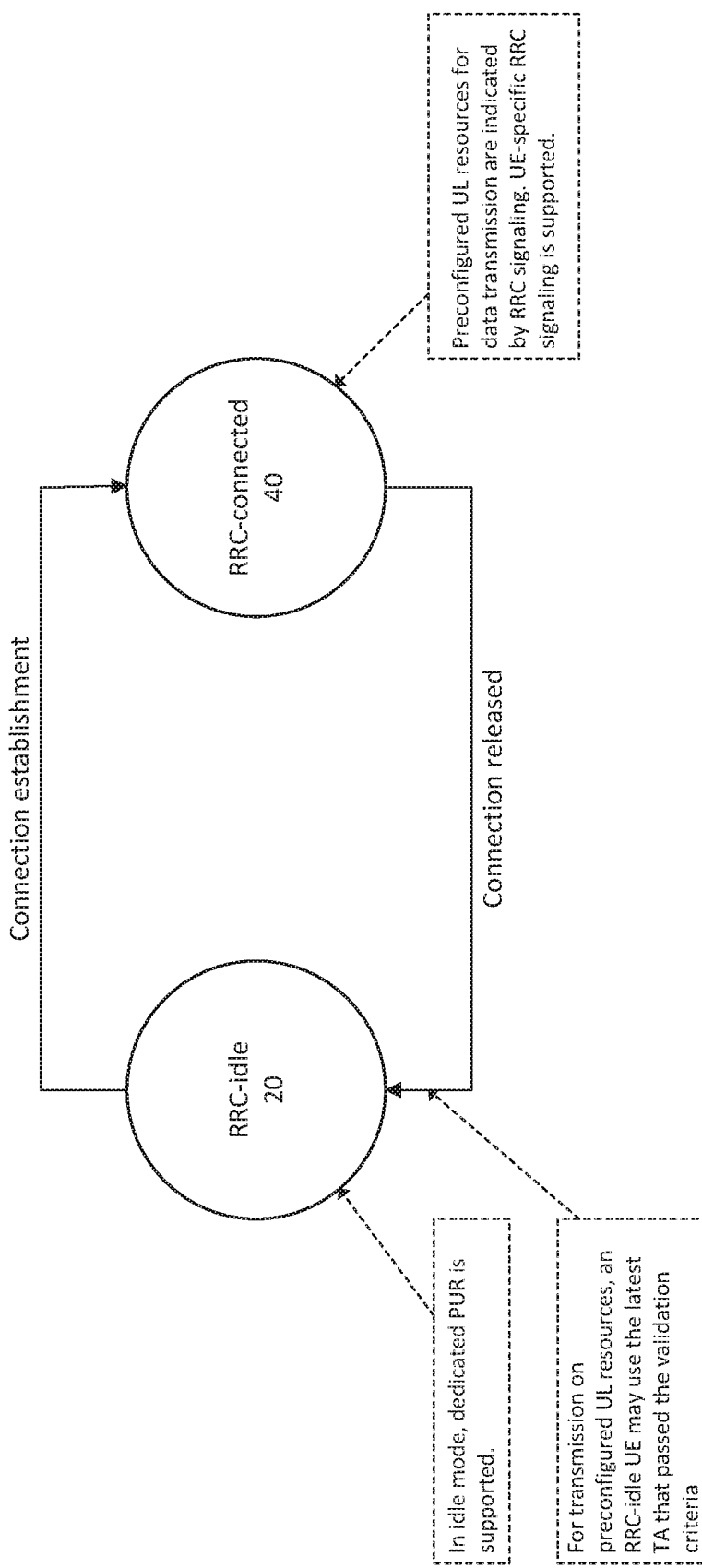
FIG. 1 illustrates a framework for Dedicated PUR in IDLE mode.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 10.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 12.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH (or NPDSCH) in DL, PUSCH (or NPUSCH) in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multicarrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re) selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Figure 2A:
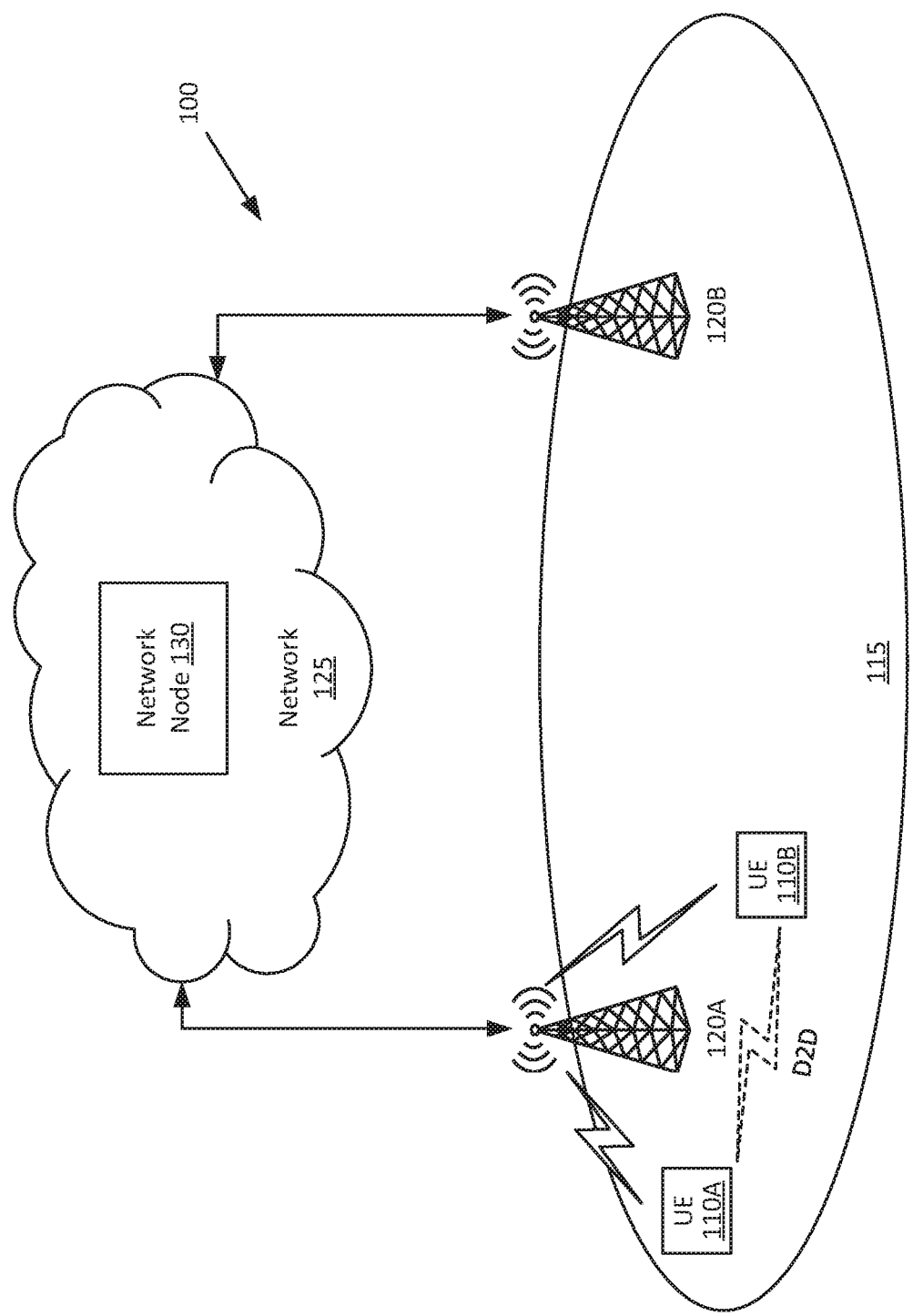
FIG. 2 illustrates an example wireless network.

FIG. 2a illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node 110 using the non-access stratum layer. In non-access stratum signaling, signals between UEs 110 and the core network node 130 can be transparently passed through the radio access network. In some embodiments, radio access nodes 120 can interface with one or more network nodes 130 over an internode interface.

In some embodiments, network node 130 can be a location server 130, such as an E-SMLC. Location server 130 can exchange signals directly, or indirectly, with UEs 110, radio access nodes 120 and/or other network node(s).

Figure 2B:
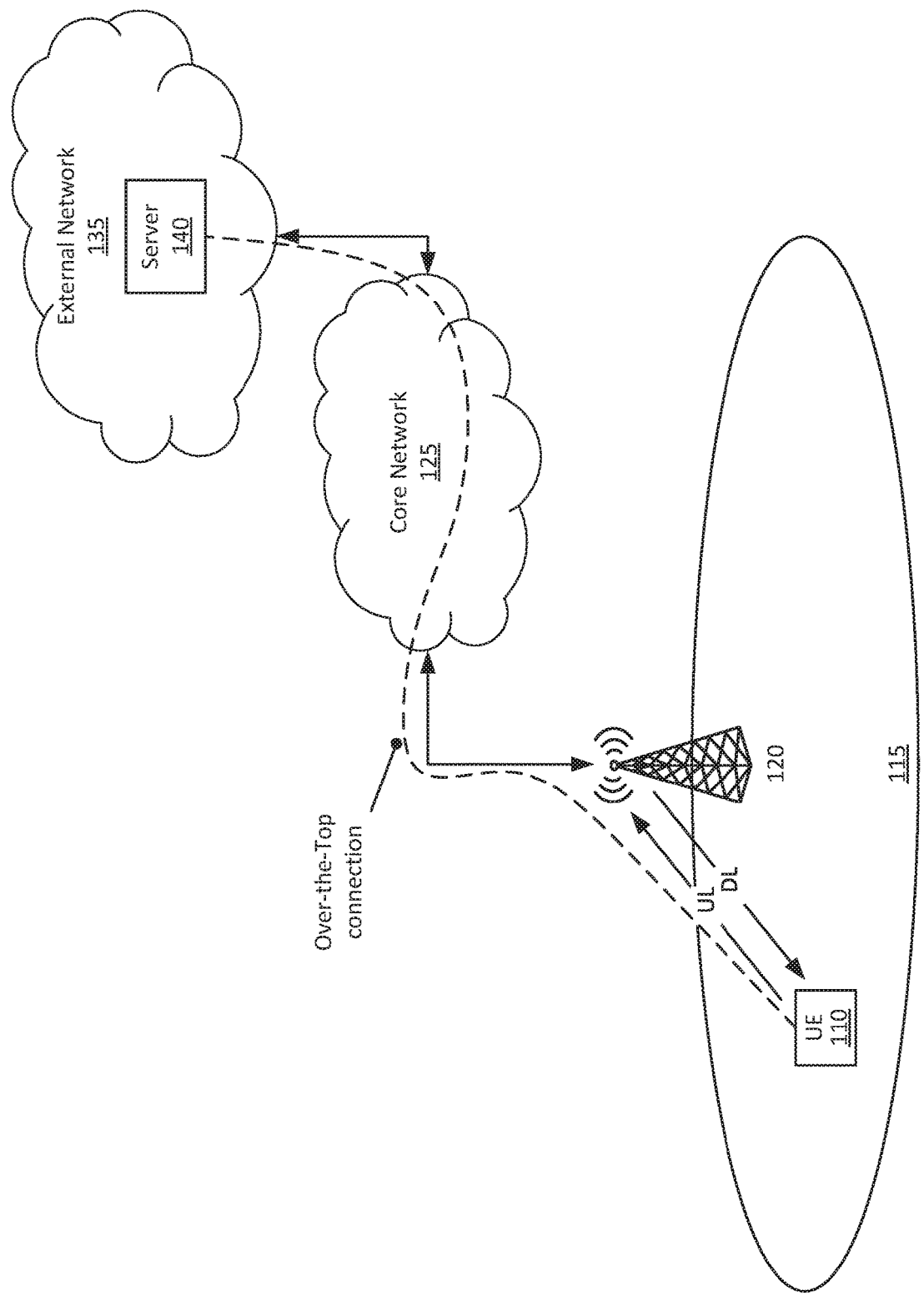

FIG. 2b illustrates an example of signaling in wireless network 100. As illustrated, the radio interface generally enables the UE 110 and the radio access node 120 to exchange signals and messages in both a downlink (DL) direction (from the radio access node 120 to the UE 110) and in an uplink (UL) direction (from the UE 110 to the radio access node 120).

The radio interface between the wireless device 110 and the radio access node 120 typically enables the UE 110 to access various applications or services provided by one or more servers 140 (also referred to as application server or host computer) located in an external network(s) 135. The connectivity between the UE 110 and the server 140, enabled at least in part by the radio interface between the UE 110 and the radio access node 120, can be described as an "over-the-top" (OTT) or "application layer" connection. In such cases, the UE 110 and the server 140 are configured to exchange data and/or signaling via the OTT connection, using the radio access network 100, the core network 125, and possibly one or more intermediate networks (e.g. a transport network, not shown). The OTT connection may be transparent in the sense that the participating communication devices or nodes (e.g., the radio access node 120, one or more core network nodes 130, etc.) through which the OTT connection passes may be unaware of the actual OTT connection they enable and support. For example, the radio access node 120 may not or need not be informed about the previous handling (e.g., routing) of an incoming downlink communication with data originating from the server 140 to be forwarded or transmitted to the UE 110. Similarly, the radio access node 120 may not or need not be aware of the subsequent handling of an outgoing uplink communication originating from the UE 110 towards the server 410.

To further increase the impact of NB-IoT, improving narrowband support for positioning is an aspect of NB-IoT in Release 14. The enhancement will be designed to maintain the ultra-low cost and complexity of the Release 13 NB-IoT user equipment (UE) where appropriate, as well as the coverage and capacity of the NB-IoT network.

Location-based services and emergency call positioning drive the development of positioning in wireless networks. Positioning support in 3GPP Long Term Evolution (LTE) was introduced in Release 9. This enables operators to retrieve position information for location-based services and to meet regulatory emergency call positioning requirements.

Figure 3:
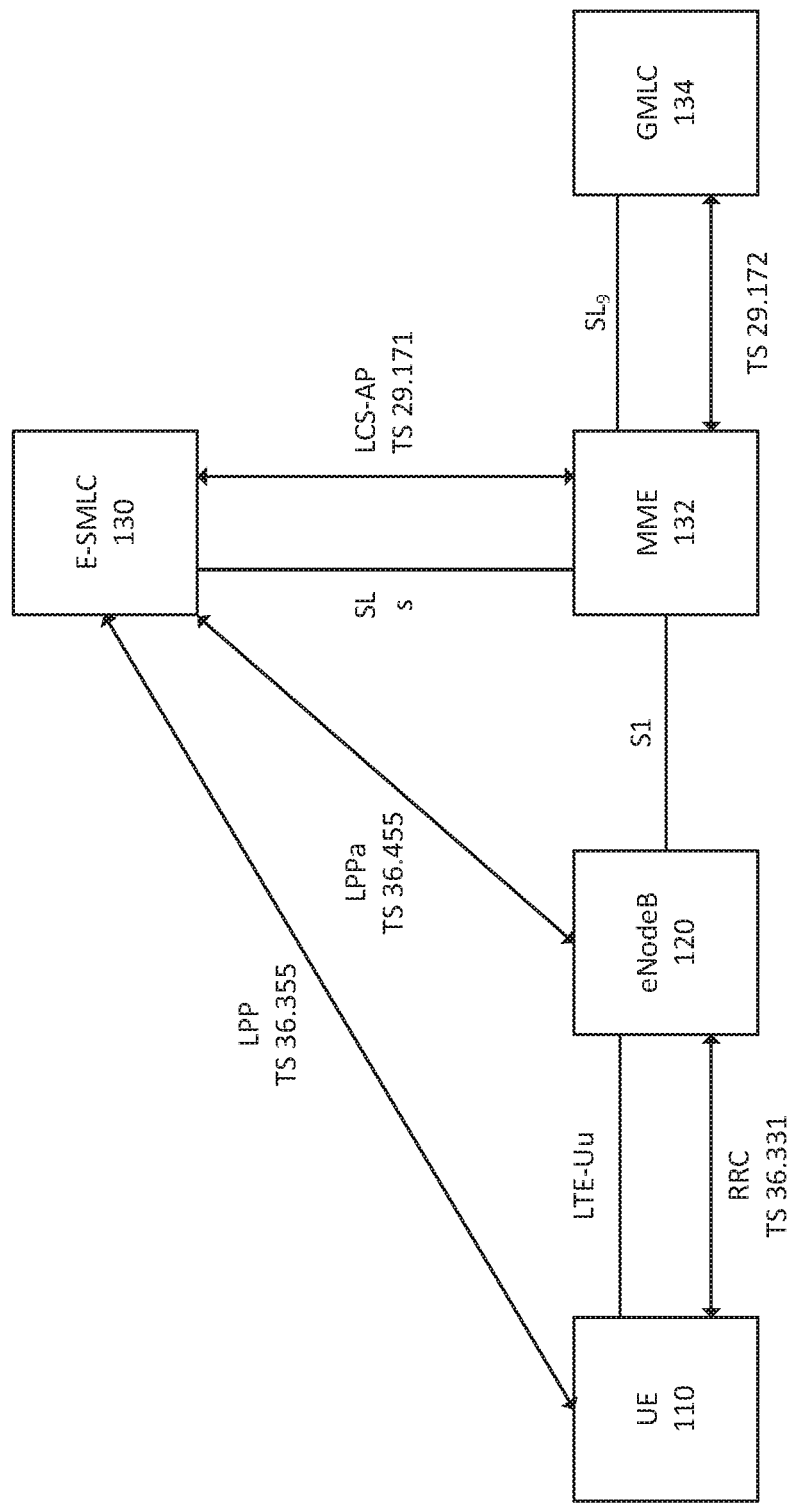
FIG. 3 illustrates an example network architecture.

Positioning in LTE is supported by the architecture in FIG. 3, with interactions between a wireless device (UE 110) and a location server, such as an Evolved Serving Mobile Location Center (E-SMLC) 130, is via the LTE Positioning Protocol (LPP). Moreover, there are also interactions between the location server 130 and the radio access node (eNodeB 120) via the LPPa protocol, to some extent supported by interactions between the eNodeB 120 and the wireless device 110 via the Radio Resource Control (RRC) protocol. The interfaces between Mobility Management Entity (MME) 132 and Gateway Mobile Location Centre (GMLC) 134 network nodes are also illustrated in FIG. 3.

Some embodiments described herein provide methods for handling periodic transmissions from a UE(s) and their resulting retransmissions, to prevent them from blocking each other as well as "self-blocking" over the pre-configured uplink resources. Some methods described herein may also be implemented on a shared PUR scheme.

For a Dedicated PUR scheme in idle mode, one use case corresponds to handling periodic data transmissions typically followed by a period of inactivity. That is, a UE transmits in uplink using some time-frequency resources, and thereafter it remains silent in uplink (where other UE(s) can transmit over the same resources) until the beginning of the next period to start over.

One potential problem with periodic transmissions over PUR is that, in principle, they do not leave room (e.g. in time and/or frequency resources) for potential retransmissions. This is because every time a new period begins, the UE is expected to report new data (for example, a device is typically expected to report a new pollution level in every period). However, when a transmission fails, the uplink resources that on a periodic basis become available for the UE would in principle have to be used for performing the retransmission. This can result in "self-blocking" preventing the transmission of the new data. This issue can become even more critical when several retransmissions are required, resulting in the blocking of several transmission periods in a row which otherwise would be used to transmit new data.

This problem can apply for one or multiple UEs using PUR, which may include handling UEs having UL transmissions with same or different durations, as well as UEs having same or different transmission periodicities.

For handling periodic transmissions and their resulting retransmissions on the preconfigured uplink resources (PUR), the following embodiments will be considered.

The "PUR period" duration and/or number of periods can depend on the number of supported retransmissions.

The PUR allocation includes a gap for potential retransmissions, during which no other PUR UE can be allocated. The UE monitors (M/N)PDCCH for HARQ retransmission in at least parts of the gap for dynamical scheduling of retransmissions. The resources are however not reserved and in the majority of cases where there is no retransmission, the radio resources can be used for dynamical scheduled transmission for non-PUR UEs.

Some embodiments include a PUR Scheduling Information adjustment that is triggered by retransmission(s). Some embodiments include an "automatic" fallback to the original PUR Scheduling Information upon a successful retransmission; others include an explicit indication to return to the original PUR Scheduling Information upon a successful retransmission.

Some embodiments include multiple granting of PUR resources for handling PUR transmissions and their retransmissions.

In some embodiments, PUR retransmissions can be scheduled using non-PUR resources.

Figure 4:
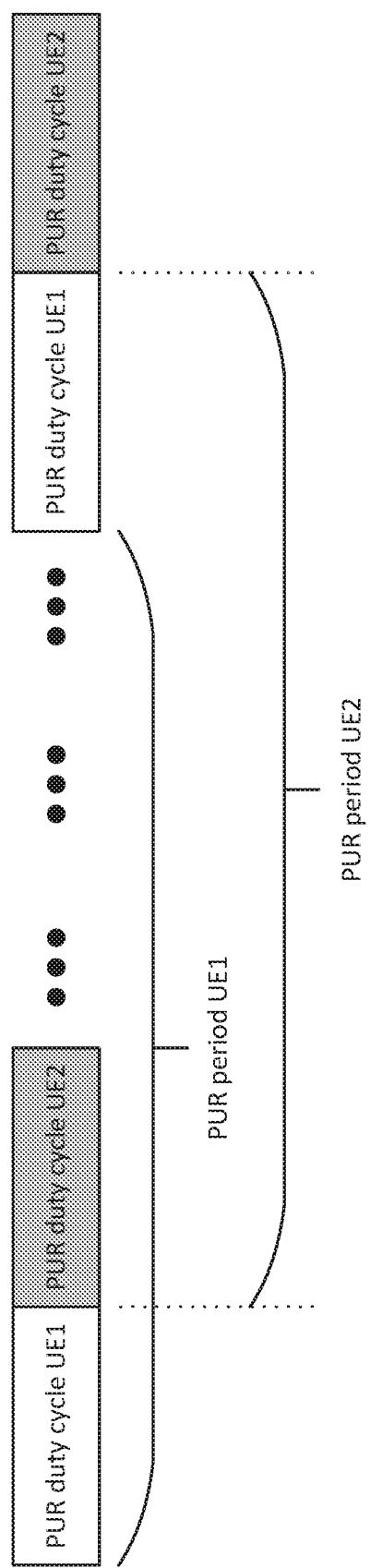
FIG. 4 illustrates an example PUR period.

FIG. 4 illustrates an example of a PUR duty cycle and a PUR period. Dedicated PUR is in principle intended for deterministic transmissions, that is, data transmission occupying a number of subframes followed by inactivity encompassing normally a larger number of subframes until next period is reached to start over. In other words, a transmission over pre-configured uplink resources is essentially composed of a "PUR duty cycle" (e.g. the transmission length) and "PUR period" as shown in FIG. 4.

The "PUR duty cycle" and the "PUR period" can depend on the data traffic characteristic and the coverage location of the device (e.g. the required number of repetitions influence the "PUR transmission length").

In some situations where a PUR transmission has failed, a retransmission would have to be performed on the most immediate uplink resources reserved for that UE during the upcoming PUR period. However, using those uplink resources would result in a "self-blocking" where the retransmission would prevent the transmission of new data, as shown in FIG. 5.

Figure 5:
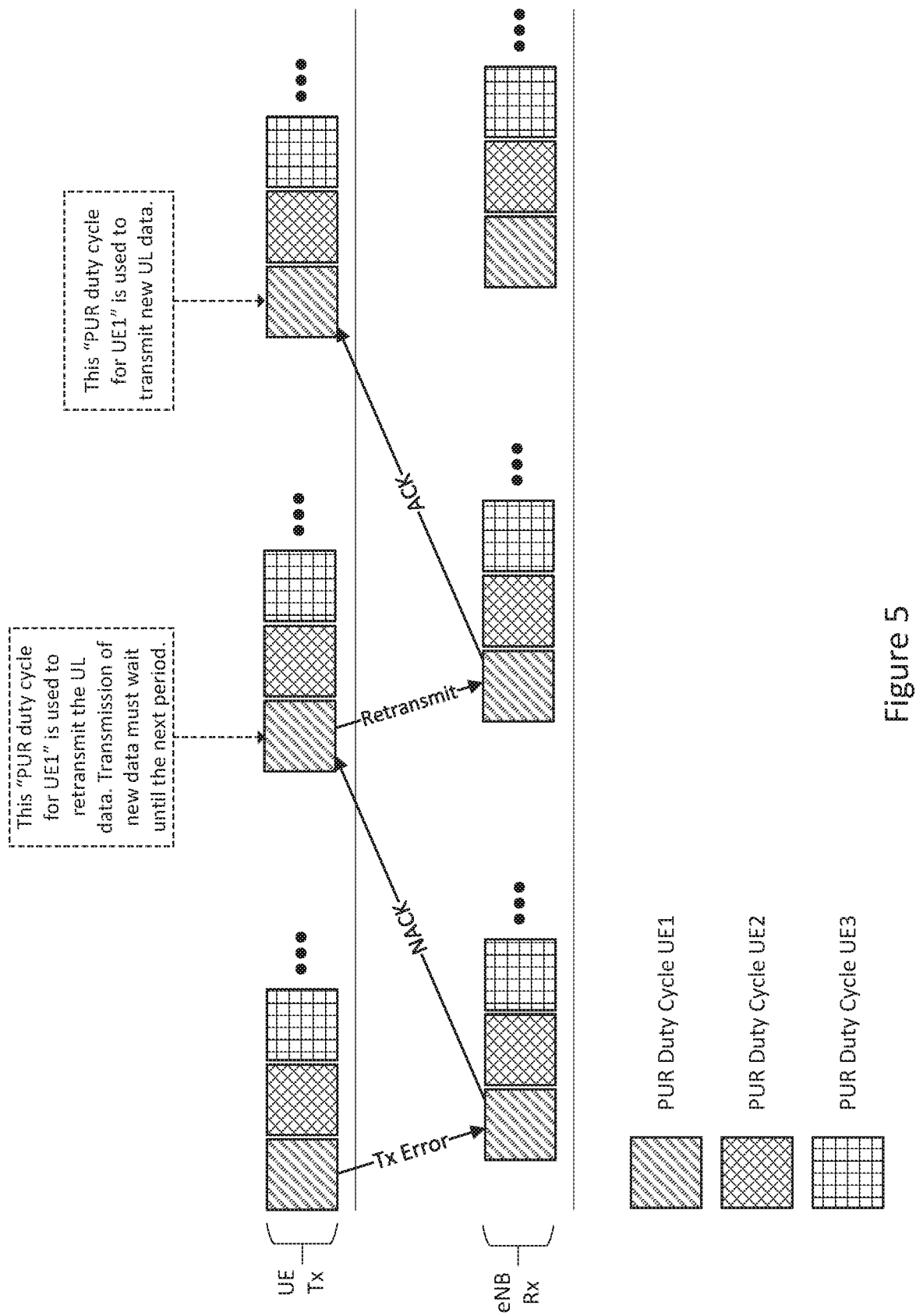
FIG. 5 illustrates an example of transmission self-blocking.

FIG. 5 illustrates an example of a device transmitting over PUR on a periodic basis being expected to deliver new data (e.g. an updated pollution/temperature report) every time a new period begins. However, as illustrated, a retransmission will prevent the UE from reporting new data. The situation becomes more severe when one retransmission attempt is not sufficient, since the periodic uplink resources may be blocked by retransmissions several times in a row. Hence, aiming at preventing the retransmissions from blocking the preconfigured uplink resources granted on a periodic basis, a number of embodiments will be discussed.

Retransmission Conditioning the PUR Period Duration and/or Number of Periods (Over-Dimensioned PUR Configuration)

This embodiment is intended to anticipate the occurrence of a retransmission. For example, a UE configured to use dedicated PUR using at most one retransmission to deliver hourly periodic reports can be granted PUR configuration via "Scheduling Information" with a "PUR period" that makes uplink resources available for this UE every half an hour. According to this example the UE can successfully or unsuccessfully perform a transmission.

1. The UE Performs a Transmission Unsuccessfully

The UE is configured to transmit data every half an hour, however the actual information that is expected to be reported occurs every hour. Thus, when an uplink transmission has gone wrong, the half an hour occasion would be used to perform a retransmission which, if successfully accomplished, would allow reporting of new data using the next "PUR period", and thus avoiding the self-blocking issue. In this example, the "PUR periodicity" was configured to be half of the duration of the actual periodicity required by the application. However, the "PUR period" could have also been configured to be any other fraction of the period that is actually required by the application.

2. The UE Performs a Transmission Successfully

Following the example where the UE has been configured to transmit every half an hour, even though a report is indeed needed every hour, what may happen is that the transmission may be successful, in which case the half an hour transmission occasion wouldn't be needed. In this case, for not having to force the UE to transmit in such an occasion, the UE can "skip the uplink transmission" which is a process that is compatible for UEs using PUR (i.e., in RAN1 #95 "For dedicated PUR in idle mode, the UE may skip UL transmissions."). Thus, this method can be combined with "skip UL transmissions", for example if this method has been used to over-dimension the "PUR period" so as to account for potential retransmissions, then an "ACK" can be used to trigger a "skip UL transmission".

The use of this method can be considered as a trade-off between an estimate of the foreseen retransmissions and a potential waste of resources when in a "over-dimensioned" configuration that accounts for resources for retransmissions, the original transmission was successful or a retransmission required one or few attempts.

By adapting the "PUR period" and the skip UL feature, this embodiment can also extend to the case where the UE is configured to use dedicated PUR for more than one retransmission(s).

PUR Scheduling Information Adjustment Triggered by Retransmissions

In other embodiments for preventing a retransmission from blocking the periodic transmission of new data on dedicated PUR, the eNodeB can signal to the UE a "Scheduling Information" update triggered by an unsuccessful transmission. The "Scheduling Information" update would adjust, for example, the "PUR period" to be shorter and more frequent. In such a way, the retransmission could finish before the originally configured "PUR period".

For example, a UE is configured to deliver hourly a report over dedicated PUR. In a situation where the transmission has failed, it results in the UE having to perform a retransmission. If no adjustments were performed the retransmission would occupy the uplink pre-configured resources in the upcoming "PUR period". This means that even if the retransmission were successful with just one attempt, the transmission of new data would have to wait one more hour until the next "PUR period" starts. That is, the temperature update with respect to the latest received information would come two hours later, and not hourly as it was supposed to be. Hence, when a transmission fails, this triggers a "Scheduling Information" update which, according to this example, would change the "PUR period" from every hour to every 15 min (e.g. ¼ of the original "PUR period"). This new "PUR period" comes into effect when indicated by the eNodeB, which aims at finishing the retransmissions before the original "PUR period" (i.e., the hourly "PUR period") reaches its new transmission occasion. In this example, at time 0 the original "hourly PUR period" would be unsuccessful, hence the UE would receive from the eNodeB the "Scheduling Information" update to adjust the "PUR period" to be ¼ of the original. The eNodeB also indicates that at time 0+15 min the first retransmission is to be performed, if a second retransmission is required, it would occur at time 0+15 min+15 min. Once the retransmission is successfully accomplished, the corresponding UE could optionally automatically fallback to the original "Scheduling Information" or could receive explicit signaling to modify the "Scheduling Information".

Automatic Fallback to the Original PUR Scheduling Information Upon a Successful Retransmission In one embodiment, upon a successful retransmission, the UE automatically performs a fallback to the original "Scheduling Information", which in this example is to continue reporting the temperature hourly. The automatic fallback to the original PUR "Scheduling Information" allows for signaling reductions.

Explicit Indication to Return to the Original PUR Scheduling Information Upon a Successful Retransmission In another embodiment, upon a successful retransmission, the UE can expect signaling from the eNodeB indicating a "Scheduling Information" update which can be the original information (in this example hourly reports) or any other. The explicit signaling approach allows for flexibility, since the UE is not restricted to go back to use the original "Scheduling Information" since it can be indicated to use a completely new "Scheduling Information" if needed.

It is noted that although the PUR period in the above examples is given in time units, it may also be given in terms of H-SFN, SFN, and subframe number, for example.

Multiple Granting of PUR Resources for Handling PUR Transmissions and their Retransmissions In some embodiments for preventing a retransmission from blocking the periodic transmission of new data on dedicated PUR, a UE can be granted multiple "PUR resources". That is, a first PUR's time-frequency resource can be used for the hourly temperature reports, while a second PUR's time-frequency resource can be configured with a shorter "PUR period" than the first time-frequency resource for handling retransmissions. The time-frequency resource for a given UE that are used for handling retransmissions are not necessarily used by other UEs for the same purpose. That is, other UEs can use those time-frequency resources for delivering their actual reports and not for retransmissions. Similarly, the time-frequency resource for a given UE that are used for delivering reports are not necessarily used by other UEs for the same purpose. Moreover, this method can also make use of the ability of the UEs using PUR to skip UL transmissions.

A second time-frequency resource can be used only for performing retransmissions, which can be in the same or different subcarrier allocation, PRB, or narrowband that can be used or not for PUR allocations. In some embodiments, the second resource for retransmissions can be dynamically configured as required.

One scenario of granting multiple "PUR resources" that may be relevant is when the same UE is capable of delivering at least two reports of different nature (e.g., pollution report and temperature report) with different periodicities. In this case, for example, the UE could use the time-frequency resource of the first PUR to deliver pollution reports and for handling retransmissions of other type of reports (temperature updates) that it will deliver using the second PUR. Conversely, the time-frequency resource of the second PUR could be used by the UE to deliver temperature reports and for handling retransmissions of other type of reports (pollution updates) that it has delivered using the first PUR time-frequency resource.

The PUR period durations encompass integer numbers multiple of each other to allow for multiplexing UEs with same or different PUR period lengths, whereas the scaling factors used to shorten the PUR period lengths are not limited to fractional numbers.

Transmissions Followed by Gap for Potential Retransmissions

In some embodiments, the two consecutive PUR transmissions of two UEs can be restricted from being scheduled back-to-back, thus leaving room for potential retransmissions. In this case, the gap between the consecutive PUR allocations of two UEs can be decided based on the number of retransmissions, configured or predefined between the network and UE. In one embodiment, this is achieved by restriction in the PUR configuration. In another embodiment it is up to network implementation. In a third embodiment the retransmission gap is part of the PUR allocation, i.e. subsequent to the PUR allocation and can be configured UE specifically. For any solution, the UE would monitor (M/N) PDCCH during a configured time window for any scheduling of PUR retransmission. In this case the PUR configuration is only dependent on the traffic profile of the UE and is not altered by retransmissions due to varying radio conditions.

Retransmissions on Non-PUR Resource(s)

In other embodiments, instead of scheduling retransmissions on the PUR resources dedicated for the UE or other UEs performing PUR, when a PUR transmission fails, the network can schedule retransmissions on whatever time-frequency resources are available, not necessarily the same dedicated D-PUR resource. This way, there is no need for adjustment of "PUR scheduling information".

It will be appreciated that the various embodiments discussed herein are also applicable for the case of contention-free shared PUR.

Figure 6:
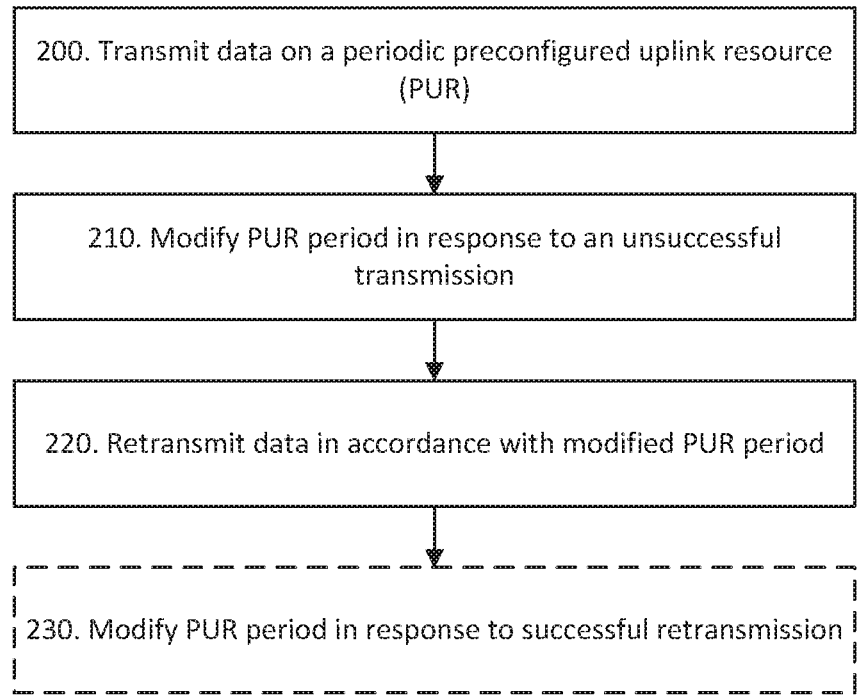
FIG. 6 is a flow chart illustrating a method which can be performed in a wireless device.

FIG. 6 is a flow chart illustrating a method which can be performed in a wireless device (e.g. a target device), such as UE 110. The method can include:

Step 200: Transmitting data on a dedicated periodic PUR in accordance with a first PUR period. The PUR period can define the duration (in time, subframes, etc.) between subsequent periodic transmission opportunities for the UE. The at least one PUR period can be configured by the network via RRC and/or UE-specific signaling.

Step 210: Modifying the PUR period in response to an unsuccessful transmission. Responsive to determining that a data transmission was unsuccessful, the first PUR period can be modified/changed to a second PUR period duration. The second PUR period can be shorter and/or more frequent than the first PUR period. In some embodiments, the UE automatically adjusts the PUR period responsive to an unsuccessful transmission. In some embodiments, the UE receives a scheduling information update from a network node indicating the second PUR period to be used for retransmission attempt(s). In some embodiments, the UE is configured with (e.g. granted) a first time-frequency resource for transmissions and a second time-frequency resource for retransmissions.

Step 220: Retransmitting data in accordance with the modified PUR period. The UE can retransmit the failed data transmission in the next scheduled time-frequency resource in accordance with the modified PUR period. In some embodiments, the UE can alternatively retransmit the data using a resource other than the PUR (e.g. a non-PUR resource(s)).

Step 230: Responsive to a successful retransmission, modify the PUR period. The PUR period can be adjusted to be the first (e.g. original) PUR period after successful retransmission. In some embodiments, the UE is configured to automatically adjust the PUR period following a successful retransmission. In some embodiments, the UE can receive a scheduling information update from a network node indicating a new PUR period after the successful retransmission. The new PUR period can be a third (e.g. different) PUR period or it can be the first (e.g. originally configured) PUR period.

It will be appreciated that one or more of the above steps can be performed simultaneously and/or in a different order. Also, steps illustrated in dashed lines are optional and can be omitted in some embodiments.

Figure 7:
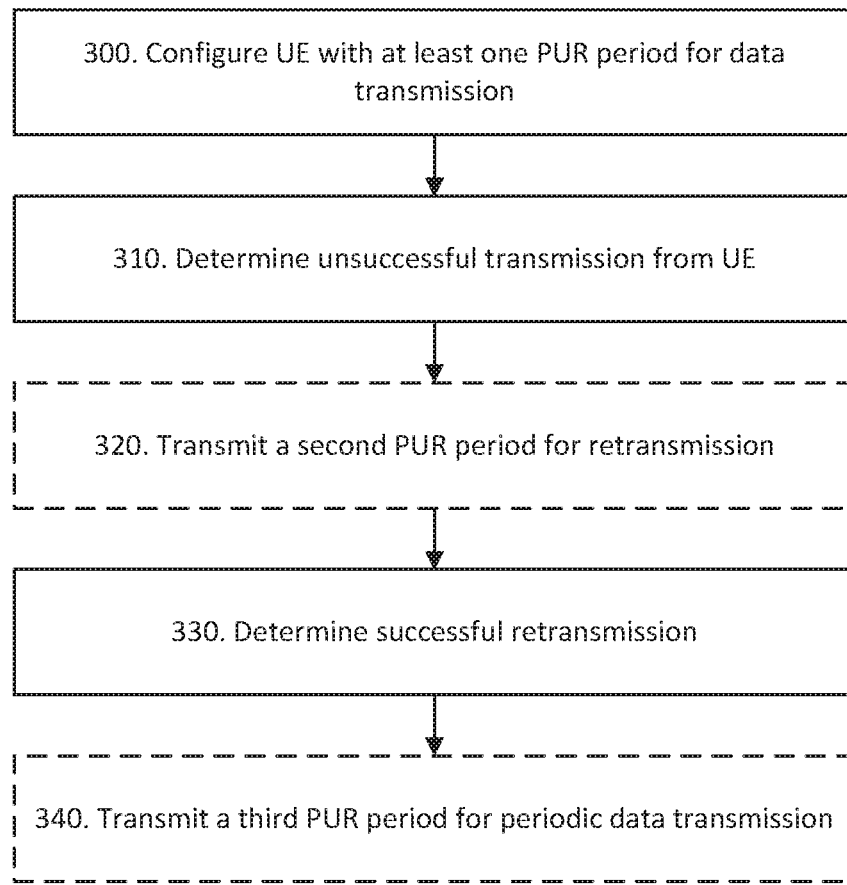
FIG. 7 is a flow chart illustrating a method which can be performed in a network node.

FIG. 7 is a flow chart illustrating a method which can be performed in a network node such as radio access node 120. The network node can be an eNB or gNB as have been described herein. The method can include:

Step 300: The network node can configure a UE with at least one PUR period for data transmission. In some embodiments, the PUR period can be "over-dimensioned" such that the configured period is shorter/more frequent than the actual required frequency of data transmissions by the UE. In another embodiment, the network node configures the UE with a first PUR period to be used for data transmission(s) and a second PUR period to be used for retransmission(s). The second PUR period can be shorter/more frequent than the first PUR period. The network node can configure the UE via RRC signaling and/or UE-specific signaling.

Step 310: The network node can identify/determine an unsuccessful data transmission by the UE.

Step 320: Optionally, responsive to determining the unsuccessful transmission, the network node can transmit a second PUR period value to the UE to be used for retransmission. The second PUR period can be shorter/more frequent than the first PUR period.

Step 330: The network node can identify/determine a successful data retransmission by the UE.

Step 340: Optionally, responsive to determining the successful retransmission, the network node can transmit a third PUR period value to the UE to be used for periodic data transmission. In some embodiments, the third PUR period can be the same value as the first (e.g. original) PUR period. In other embodiments, the third PUR period can be a different value than the first PUR period.

It will be appreciated that one or more of the above steps can be performed simultaneously and/or in a different order. Also, steps illustrated in dashed lines are optional and can be omitted in some embodiments.

The various embodiments for handling periodic transmissions and their resulting retransmissions allow for preventing retransmissions to block the transmission of new data on PUR resources that are made available to a UE on a periodic basis. In some embodiments, a number of retransmissions can be prevented that would result in the blocking of several consecutive transmission periods, which otherwise would be used to transmit new data. Efficient resource allocation makes use of the possibility of multiplexing UL transmissions with same or different durations, as well as UEs having same or different transmission periodicities. Some methods for handling periodic transmissions and their resulting retransmissions may be extendable for Shared PUR schemes. Further, the automatic fallback procedures embedded in some of the embodiments can allow for signaling reduction.

Figure 8:
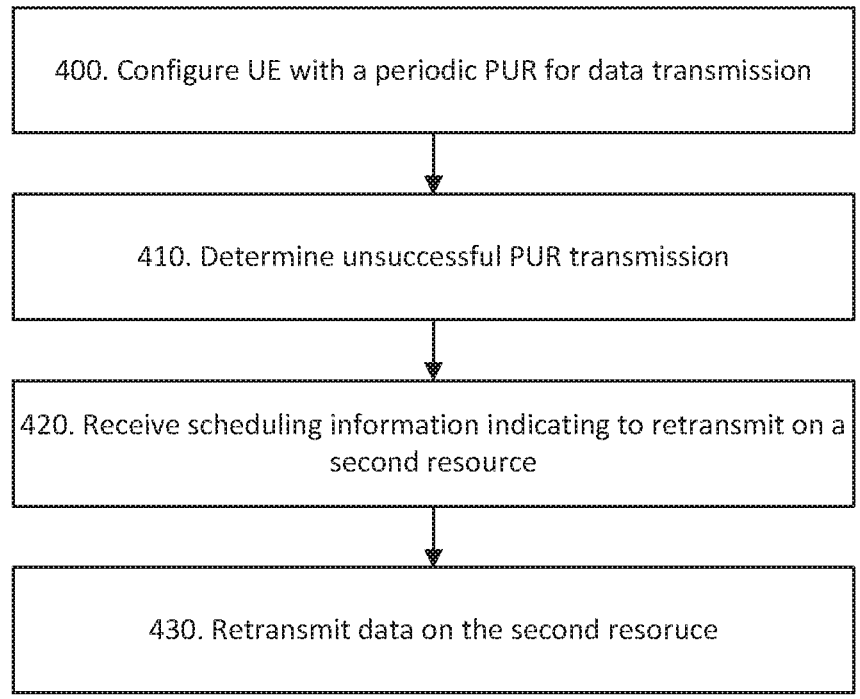
FIG. 8 is a flow chart illustrating a method which can be performed in a wireless device.

FIG. 8 is a flow chart illustrating a method which can be performed in a wireless device (e.g. a target device), such as UE 110. The method can include:

Step 400: The UE is configured with a periodic PUR for data transmission. The PUR configuration can be defined by a PUR transmission length and a PUR period. The PUR period can define the duration (in time, subframes, etc.) between subsequent periodic transmissions, or transmission opportunities, by the UE. The PUR can be configured by the network via RRC and/or UE-specific signaling.

Step 410: The UE determines that a first data transmission on the PUR was unsuccessful. This can be determined in accordance with receiving a NACK or similar message from the network.

Step 420: The UE receives scheduling information from a network node indicating to retransmit the unsuccessful first transmission on a second resource. In some embodiments, the second resource can be a non-PUR resource. In other embodiments, the second resource can be a second PUR resource (e.g. other than the originally configured PUR). In some embodiments, the scheduling information can indicate to modify the duration of the configured PUR period. In some embodiments, the UE can be configured with a first time-frequency resource for transmissions (e.g. the periodic PUR) and a second time-frequency resource for retransmissions.

Step 430: The UE retransmits in accordance with the received scheduling information. The UE can retransmit the failed first data transmission on the second (e.g. non-PUR, or second PUR) resource.

It will be appreciated that one or more of the above steps can be performed simultaneously and/or in a different order. Also, steps illustrated in dashed lines are optional and can be omitted in some embodiments.

Figure 9:
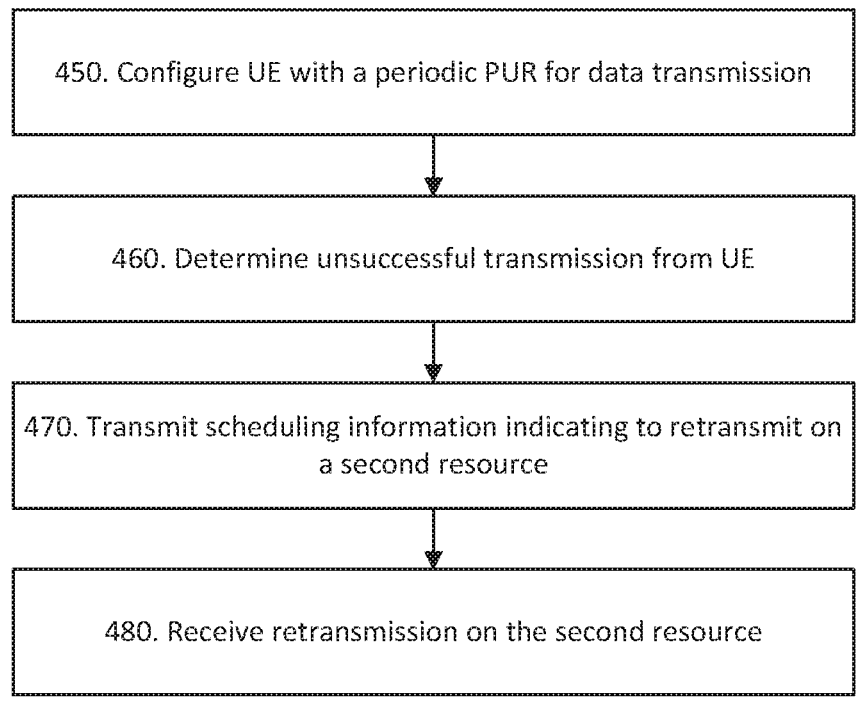
FIG. 9 is a flow chart illustrating a method which can be performed in a network node.

FIG. 9 is a flow chart illustrating a method which can be performed in a network node such as radio access node 120. The network node can be an eNB or gNB as have been described herein. The method can include:

Step 450: The network node can configure a UE with at least one periodic PUR for data transmission. The network node can configure the UE via RRC signaling and/or UE-specific signaling. The PUR can be defined by a PUR transmission length and a PUR period. The PUR period can define the duration (in time, subframes, etc.) between subsequent periodic transmissions, or transmission opportunities, by the UE.

Step 460: The network node can identify/determine that a first data transmission on the PUR by the UE was unsuccessful. In some embodiments, the network node can transmit a NACK or other message to the UE to indicate the unsuccessful transmission.

Step 470: The network node transmits scheduling information to the UE indicating to retransmit the unsuccessful first transmission on a second resource. In some embodiments, the second resource can be a non-PUR resource. In other embodiments, the second resource can be a second PUR resource (e.g. other than the configured PUR). In some embodiments, the second resource can be dynamically scheduled by the network node Step 480: The network node receives the first data transmission on the second resource.

It will be appreciated that one or more of the above steps can be performed simultaneously and/or in a different order. Also, steps illustrated in dashed lines are optional and can be omitted in some embodiments.

Figure 10:
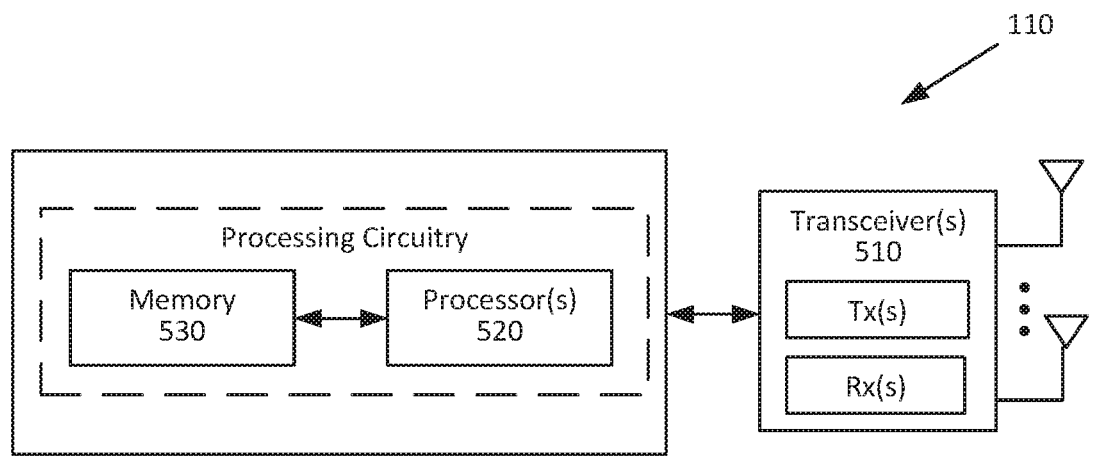
FIG. 10 is a block diagram of an example wireless device.

FIG. 10 is a block diagram of an example wireless device, UE 110, in accordance with certain embodiments. In some embodiments, wireless device 110 can be a NB-IoT device. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 10 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 11:
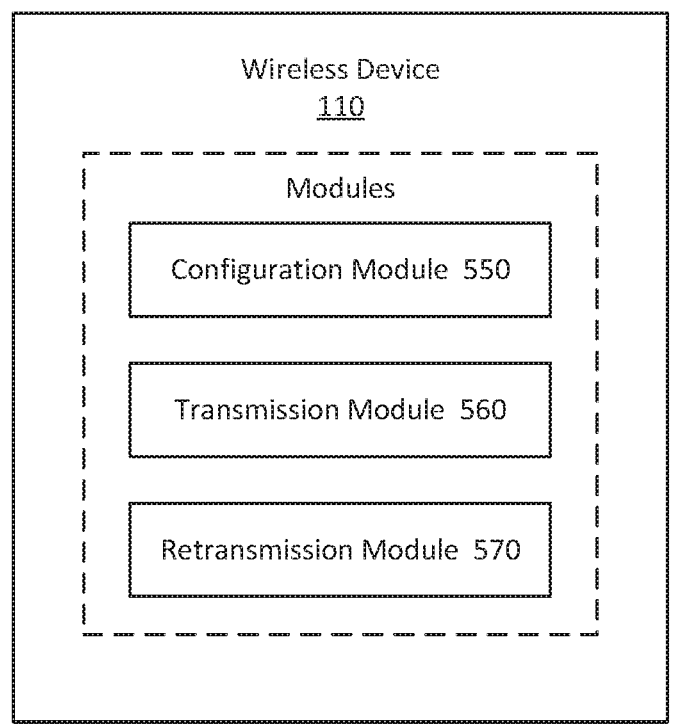
FIG. 11 is a block diagram of an example wireless device with modules.

In some embodiments, the wireless device UE 110 may comprise a series of modules configured to implement the functionalities of the wireless device described above. Referring to FIG. 11, in some embodiments, the wireless device 110 may comprise a configuration module 550 for obtaining and configuring PUR information, a transmission module 560 for transmitting data in accordance with a first PUR period, and a retransmission module 570 for retransmitting data in accordance with a second resource.

It will be appreciated that the various modules may be implemented as combination of hardware and software, for instance, the processor, memory and transceiver(s) of UE 110 shown in FIG. 10. Some embodiments may also include additional modules to support additional and/or optional functionalities.

Figure 12:
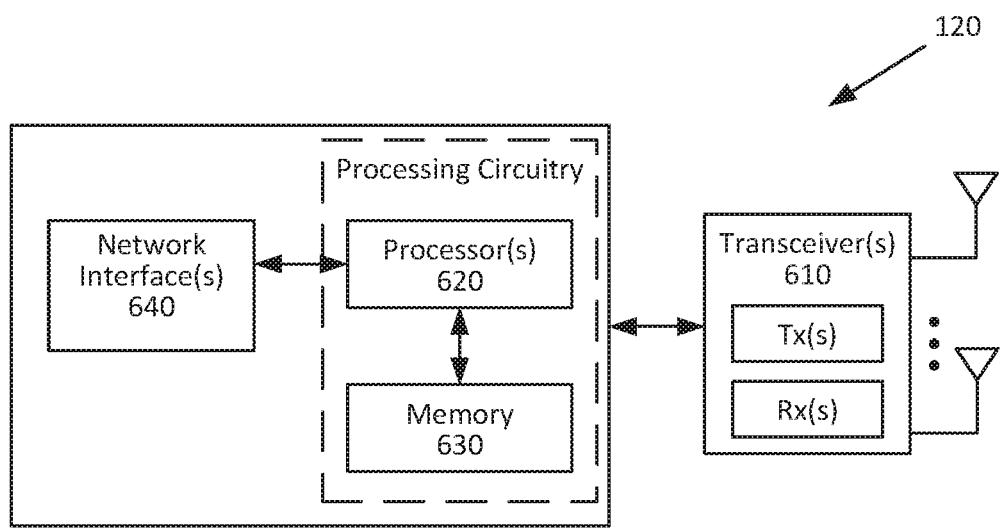
FIG. 12 is a block diagram of an example radio access node.

FIG. 12 is a block diagram of an exemplary radio access node 120, in accordance with certain embodiments. Radio access node 120 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by a radio access node 120, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of radio access node 120, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 120, send output from node 120, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of radio access node 120 can include additional components beyond those shown in FIG. 10 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 12 may be included in other network nodes (such as core network node 130). Other network nodes may optionally include or not include a wireless interface (such as the transceiver described in FIG. 12).

Figure 13:
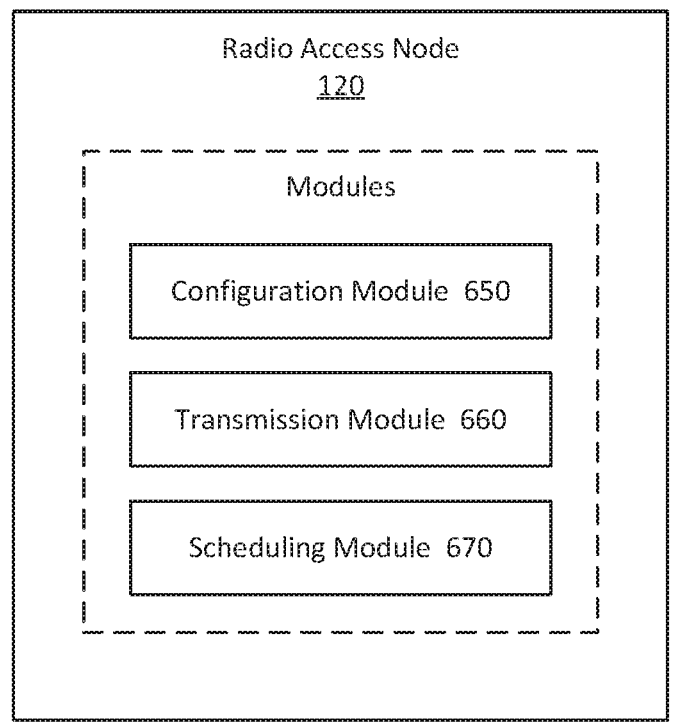
FIG. 13 is a block diagram of an example radio access node with modules.

In some embodiments, the radio access node 120, may comprise a series of modules configured to implement the functionalities of the network node described above. Referring to FIG. 13, in some embodiments, the radio access node 120 can comprise a configuration module 650 for configuring a wireless device with at least one PUR period for data transmissions, a transmission module 660 for determining successful/unsuccessful data transmissions and retransmissions by the wireless device; and a scheduling module 670 for indicating resources to be used for retransmission.

It will be appreciated that the various modules may be implemented as combination of hardware and software, for instance, the processor, memory and transceiver(s) of radio access node 120 shown in FIG. 12. Some embodiments may also include additional modules to support additional and/or optional functionalities.

Figure 14:
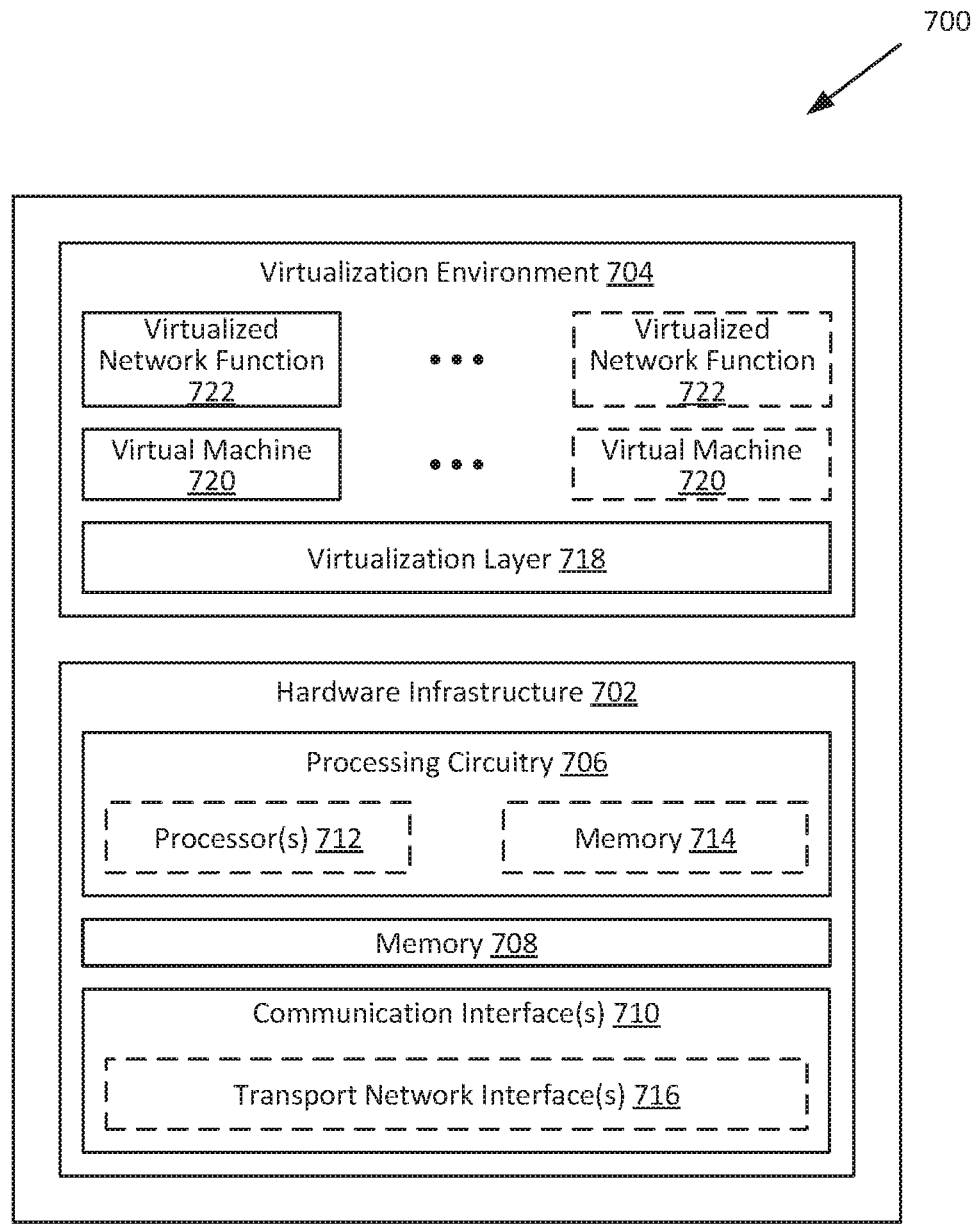
FIG. 14 is a block diagram of an example virtualized processing node.

Turning now to FIG. 14, some network nodes (e.g. radio access nodes 120, network nodes 130) in the wireless communication network 100 may be partially or even entirely virtualized. As a virtualized entity, some or all the functions of a given network node are implemented as one or more virtual network functions (VNFs) running in virtual machines (VMs) hosted on a typically generic processing node 700 (or server).

Processing node 700 generally comprises a hardware infrastructure 702 supporting a virtualization environment 704.

The hardware infrastructure 702 generally comprises processing circuitry 706, a memory 708, and communication interface(s) 710.

Processing circuitry 706 typically provides overall control of the hardware infrastructure 702 of the virtualized processing node 700. Hence, processing circuitry 706 is generally responsible for the various functions of the hardware infrastructure 702 either directly or indirectly via one or more other components of the processing node 700 (e.g. sending or receiving messages via the communication interface 710). The processing circuitry 706 is also responsible for enabling, supporting and managing the virtualization environment 704 in which the various VNFs are run. The processing circuitry 706 may include any suitable combination of hardware to enable the hardware infrastructure 702 of the virtualized processing node 700 to perform its functions.

In some embodiments, the processing circuitry 706 may comprise at least one processor 712 and at least one memory 714. Examples of processor 712 include, but are not limited to, a central processing unit (CPU), a graphical processing unit (GPU), and other forms of processing unit. Examples of memory 714 include, but are not limited to, Random Access Memory (RAM) and Read Only Memory (ROM). When processing circuitry 706 comprises memory 714, memory 714 is generally configured to store instructions or codes executable by processor 712, and possibly operational data. Processor 712 is then configured to execute the stored instructions and possibly create, transform, or otherwise manipulate data to enable the hardware infrastructure 702 of the virtualized processing node 700 to perform its functions.

Additionally, or alternatively, in some embodiments, the processing circuitry 706 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 706 comprises application-specific and/or programmable circuitry (e.g., ASICs, FPGAs), the hardware infrastructure 702 of the virtualized processing node 700 may perform its functions without the need for instructions or codes as the necessary instructions may already be hardwired or preprogrammed into processing circuitry 706. Understandably, processing circuitry 706 may comprise a combination of processor(s) 712, memory(ies) 714, and other application-specific and/or programmable circuitry.

The communication interface(s) 710 enable the virtualized processing node 700 to send messages to and receive messages from other network nodes (e.g., radio network nodes, other core network nodes, servers, etc.). In that sense, the communication interface 710 generally comprises the necessary hardware and software to process messages received from the processing circuitry 706 to be sent by the virtualized processing node 700 into a format appropriate for the underlying transport network and, conversely, to process messages received from other network nodes over the underlying transport network into a format appropriate for the processing circuitry 706. Hence, communication interface 710 may comprise appropriate hardware, such as transport network interface(s) 716 (e.g., port, modem, network interface card, etc.), and software, including protocol conversion and data processing capabilities, to communicate with other network nodes.

The virtualization environment 704 is enabled by instructions or codes stored on memory 708 and/or memory 714. The virtualization environment 704 generally comprises a virtualization layer 718 (also referred to as a hypervisor), at least one virtual machine 720, and at least one VNF 722. The functions of the processing node 700 may be implemented by one or more VNFs 722.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:
3GPP Third Generation Partnership Project
ACK Acknowledgement
AP Access point
ARQ Automatic Repeat Request
BS Base Station
BSC Base station controller
BTS Base transceiver station
CA Carrier Aggregation
CC Component carrier
CCCH SDU Common Control Channel SDU
CG Cell group
CGI Cell Global Identifier
CQI Channel Quality information
CSI Channel State Information
DAS Distributed antenna system
DC Dual connectivity
DCCH Dedicated Control Channel
DCI Downlink Control Information
DL Downlink
DMRS Demodulation Reference Signal
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
HARQ Hybrid Automatic Repeat Request
HO Handover
IoT Internet of Things
LTE Long-Term Evolution
M2M Machine to Machine
MAC Medium Access Control
MBMS Multimedia Broadcast Multicast Services
MCG Master cell group
MDT Minimization of Drive Tests
MeNB Master eNode B
MME Mobility Management Entity
MSC Mobile Switching Center
MSR Multi-standard Radio
MTC Machine Type Communication
NACK Negative acknowledgement
NDI Next Data Indicator
NR New Radio
O&M Operation and Maintenance
OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary serving cell
PSCell Primary SCell
PUCCH Physical Uplink Control Channel
PUSCH Physical Uplink Shared Channel
RAT Radio Access Technology
RB Resource Block
RF Radio Frequency
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
TTI Transmission Time Interval
Tx Transmitter
UE User Equipment
UL Uplink
URLLC Ultra-Reliable Low Latency Communication
UTRA Universal Terrestrial Radio Access
UTRAN Universal Terrestrial Radio Access Network
V2V Vehicle-to-vehicle
V2X Vehicle-to-everything
WLAN Wireless Local Area Network

The invention claimed is:

1. A method performed by a wireless device, comprising:
configuring the wireless device with a periodic first preconfigured uplink resource (PUR) for data transmission;
determining that a first transmission on the configured first PUR was unsuccessful;
receiving dynamic scheduling information indicating to retransmit the unsuccessful first transmission on a second resource, wherein the second resource is one of a non-PUR resource and a PUR resource other than the configured periodic first PUR, and wherein the second resource does not block a time-frequency resource of the configured periodic first PUR; and
retransmitting the first transmission on the second resource.

2. The method of claim 1, wherein the first PUR configuration includes at least one of a PUR transmission length and a PUR period.

3. The method of claim 2, wherein the PUR period defines a duration between subsequent transmission opportunities.

4. The method of claim 1, wherein the periodic first PUR is configured by radio resource control (RRC) signaling.

5. A wireless device comprising a radio interface and processing circuitry configured to:
configure the wireless device with a periodic first preconfigured uplink resource (PUR) for data transmission;
determine that a first transmission on the configured first PUR was unsuccessful;
receive dynamic scheduling information indicating to retransmit the unsuccessful first transmission on a second resource, wherein the second resource is one of a non-PUR resource and a PUR resource other than the configured periodic first PUR, and wherein the second resource does not block a time-frequency resource of the configured periodic first PUR; and
retransmit the first transmission on the second resource.

6. The wireless device of claim 5, wherein the first PUR configuration includes at least one of a PUR transmission length and a PUR period.

7. The wireless device of claim 6, wherein the PUR period defines a duration between subsequent transmission opportunities.

8. The wireless device of claim 5, wherein the periodic first PUR is configured by RRC signaling.

9. A method performed by a network node, comprising:
configuring a wireless device with a periodic first preconfigured uplink resource (PUR) for data transmission;
responsive to determining that a first transmission on the first PUR was unsuccessful, transmitting dynamic scheduling information indicating to retransmit the unsuccessful first transmission on a second resource, wherein the second resource is one of a non-PUR resource and a PUR resource other than the configured periodic first PUR, and wherein the second resource does not block a time-frequency resource of the configured periodic first PUR; and
receiving the first transmission on the second resource.

10. The method of claim 9, wherein the first PUR configuration includes at least one of a PUR transmission length and a PUR period.

11. The method of claim 10, wherein the PUR period defines a duration between subsequent transmission opportunities.

12. The method of claim 9, wherein the periodic first PUR is configured by RRC signaling.

13. A network node comprising a radio interface and processing circuitry configured to:
configure a wireless device with a periodic first preconfigured uplink resource (PUR) for data transmission;
responsive to determining that a first transmission on the first PUR was unsuccessful, transmit dynamic scheduling information indicating to retransmit the unsuccessful first transmission on a second resource, wherein the second resource is one of a non-PUR resource and a PUR resource other than the configured periodic first PUR, and wherein the second resource does not block a time-frequency resource of the configured periodic first PUR; and
receive the first transmission on the second resource.

14. The network node of claim 13, wherein the first PUR configuration includes at least one of a PUR transmission length and a PUR period.

15. The network node of claim 14, wherein the PUR period defines a duration between subsequent transmission opportunities.

16. The network node of claim 13, wherein the periodic first PUR is configured by RRC signaling.

* * * * *